United States Patent Office 2,864,851
Patented Dec. 16, 1958

2,864,851

PREPARATION OF NITRILES FROM CYANOGEN AND KETONES

William L. Fierce, Crystal Lake, and Walter J. Sandner, Carpentersville, Ill., assignors to The Pure Oil Company, Chicago, Ill., a corporation of Ohio No Drawing. Application May 14, 1957
Serial No. 658,976

15 Claims. (Cl. 260—465)

This invention relates to new and useful improvements in methods for preparing organic nitriles and more particularly to a method of preparing aliphatic and aromatic nitriles by reaction of cyanogen and ketones at elevated temperatures.

It is, therefore, one object of this invention to provide an improved method for preparing aliphatic and aromatic nitriles.

Another object of this invention is to provide a method of preparing a variety of aliphatic and aromatic nitriles from ketones.

A feature of this invention is the provision of a process for preparing aliphatic and aromatic nitriles by the high temperature reaction of cyanogen and a ketone.

Another feature of this invention is the provision of a process for preparing aliphatic and aromatic nitriles, such as acetonitrile, propionitrile, acrylonitrile, and benzonitrile by the high temperature reaction of cyanogen and lower alkyl and aryl ketones at a temperature above the decomposition point of the ketone.

Other objects and features of this invention will become apparent from time to time throughout the specification and claims as hereinafter related.

This invention comprises a process in which a ketone and cyanogen are reacted at a temperature in the range from 500° to 1000° C. Within this range of temperature aliphatic and aromatic ketones decompose readily to produce free radicals and carbon monoxide, with the free radicals reacting rapidly with cyanogen to produce aliphatic and aromatic nitriles as the principal reaction products. This reaction apparently proceeds as follows:

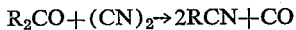
$$R_2CO + (CN)_2 \rightarrow 2RCN + CO$$

For unsymmetrical ketones the reaction products are mixed according to the free radicals liberated on decomposition of the ketone:

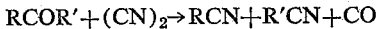
$$RCOR' + (CN)_2 \rightarrow RCN + R'CN + CO$$

This reaction proceeds well with any ketone which may be decomposed readily but is easier to carry out using ketones which are sufficiently volatile to permit their being fed to the reaction zone in the gaseous state. This reaction proceeds well with any of the lower aliphatic, aromatic, and mixed ketones as a reactant, e. g., acetone, methylethyl ketone, diethyl ketone, dipropyl ketone, dibutyl ketone, methylpropyl ketone, diamyl ketone, benzophenone, acetophenone, ethyl phenyl ketone, ethyl tolyl ketone, ditolyl ketone, dinaphthyl ketone, dibenzyl ketone, and benzyl phenyl ketone.

This reaction proceeds well at atmospheric pressure, although it may be carried out at either sub-atmospheric or super-atmospheric pressures. In carrying out this reaction the preferred mol ratio of ketone to cyanogen is in the range from 1:6 to 6:1. The lower ratios of ketone to cyanogen have been found to result in lower yields of nitriles per pass through the reaction zone. On the other hand, higher proportions of ketones produce higher yields per pass, but result in losses through side reactions of the free radicals liberated on decomposition of the ketones. While the aforementioned range of proportions is somewhat preferred, the mol ratio of ketones to cyanogen may vary widely, as for example, from 1:20 to 20:1, and still produce organic nitriles as a principal reaction product. The reaction gases may be passed through the reaction zone at a gaseous hourly space velocity of approximately 50 to 2,000, with a space velocity of 150 to 500 being preferred. In this process the term "space velocity" refers to the ratio of the volume of reactant gases, at standard temperature and pressure, charged per hour, to the volume of the reactant space.

The preferred method of carrying out this process is to mix the ketone to be reacted with cyanogen in the gaseous state and pass the mixture through a heated reaction zone. When relatively non-volatile (i. e., high boiling point) ketones are to be reacted, the ketones are fed as liquids directly to the reactor and vaporized directly into the reaction zone. Any type of reaction zone may be used which is resistant to attack by the reactants or reaction products. Quartz, high-silica glass, stainless steel, or other refractory and corrosion-resistant materials may be used. The reaction zone may be heated by any suitable means, such as combustion gases applied externally to the reactor, external or internal electrical heaters, including resistance heaters and induction heaters, heating tubes extending through the reactor, or hot refractory pebbles in the reactor.

The product gases from the reaction zone consist of a mixture of aliphatic and/or aromatic nitriles, unreacted cyanogen and ketones, carbon monoxide, and ketone decomposition products. These reaction gases are withdrawn from the reaction zone and cooled to a temperature sufficiently low to condense the nitriles and other condensable by-products, so that the unreacted cyanogen and ketones may be recycled to the reaction zone. The liquid which is condensed from the reaction gases will ordinarily have to be fractionated to obtain pure nitriles, and may have to be fractionated for efficient recycle of the cyanogen and ketones.

A number of experiments were carried out in which acetone and cyanogen were reacted at elevated temperatures under a variety of conditions. In these experiments, helium was bubbled through liquid acetone at room temperature, and the resulting stream of helium plus acetone vapor was then blended with cyanogen and passed through an empty, electrically-heated tube of Vycor high-silica glass. The gas mixture charged to the reactor tube and the product gases were analyzed by a mass spectrometer to determine the composition of the charge gas and the product gases. The experimental conditions and results are set forth in Table I.

Table I

| Run No | 70 | 71 | 82 | 83 | 84 |
|---|---|---|---|---|---|
| Temperature (°C.) | 428 | 633 | 565 | 663 | 749 |
| Mole Ratio of $CH_3COCH_3/(CN)_2$ | 0.61 | 0.65 | 1.76 | 1.83 | 1.70 |
| Gaseous hourly space velocity of charge gas | 130 | 132 | 191 | 191 | 191 |
| Percent Conversion of $(CN)_2$ | 0.0 | 21.8 | 11.5 | 16.4 | 45.7 |
| Percent Conversion of $CH_3COCH_3$ | 8.8 | 16.2 | 5.5 | 27.3 | 81.8 |
| Acetonitrile-Molar Yield per Pass | 0.0 | 4.8 | 0.9 | 7.3 | 5.8 |
| Acetonitrile-selectivity | 0.0 | 22.0 | 7.7 | 44.4 | 12.6 |
| Propionitrile-Molar Yield per Pass | 0.0 | 0.0 | 0.0 | 0.91 | 3.8 |
| Propionitrile-Selectivity | 0.0 | 0.0 | 0.0 | 5.6 | 8.2 |
| Acrylonitrile-molar Yield per Pass | 0.0 | 0.0 | 0.0 | 0.91 | 13.5 |
| Acrylonitrile-selectivity | 0.0 | 0.0 | 0.0 | 5.6 | 29.7 |

The yield per pass is defined as the moles of the indicated product formed, expressed as a percent of the moles of cyanogen charged. The selectivity is a similar percentage based upon the moles of cyanogen consumed.

From these and other experiments it has been found that there is no formation of nitriles at temperatures below about 500° C. Above 500° C. there are various aliphatic nitriles formed according to the temperature and mol ratio of the reactants. When cyanogen is present in excess, the only nitrile formed is acetonitrile. However, when acetone is present in excess, propionitrile and acrylonitrile are also formed, although acetonitrile is still a major product. In these experimental runs no catalyst was used but it is expected that suitable catalysts would accelerate the rate of reaction and would permit the reaction to proceed at lower temperatures.

In another experiment, diethyl ketone was reacted with cyanogen at 655° C. in the same apparatus and using the same procedure as the previous runs. The mol ratio of diethyl ketone to cyanogen was 0.312 and the charge gases were passed through the reaction zone at a gaseous hourly space velocity of 197. In this experiment there was a 10.3% conversion of cyanogen and 83.0% conversion of diethyl ketone. The major products of this reaction were acrylonitrile, 4.58% molar yield per pass and 44.7% selectivity; and acetonitrile, 0.75% molar yield per pass and 7.3% selectivity. No other nitriles were formed and the other products were decomposition products of the ketone.

This process works well with other aliphatic and aromatic ketones. When the ketone has an appreciable vapor pressure at room temperature, it may be vaporized in the same manner as acetone and diethyl ketone into a stream of helium. The higher boiling aliphatic and aromatic ketones are metered, as liquids, to the reaction zone.

In the preparation of benzonitrile according to this invention, benzophenone and cyanogen are reacted at a temperature above the decomposition point of the ketone in a flow apparatus substantially the same as that used in the other experiments. Benzophenone (M. P. 26°–50° C.) is melted and metered to the reaction tube using a heated peristaltic pump and heated flow lines to prevent solidification. The cyanogen is fed to the reaction tube through a separate line. The benzophenone is vaporized into the reaction zone and decomposes and reacts with the cyanogen. The gaseous products are withdrawn from the reaction tube and condensed, using an air-cooled condenser. Gaseous products passing through the condenser are analyzed by the mass spectrometer. The products from the condenser are dissolved in CCl₄ and analyzed by the infra-red spectrophotometer. At a gaseous hourly space velocity of 130–200 and reaction temperature of 600° C., there is an appreciable conversion of benzophenone after one hour reaction time. A small amount of benzonitrile is recovered in the condenser. After one hour reaction time at 750° C., the conversion of benzophenone is substantial and a substantial yield of benzonitrile is obtained.

The reaction of acetophenone and cyanogen is carried out in the same apparatus and using the same procedure as the corresponding reaction of benzophenone. As in the case of other mixed ketones, the reaction products are those produced by the reaction of cyanogen with the free radicals and with other decomposition products. At 550°–600° C. there is an appreciable decomposition of acetophenone with the production of small amounts of acetonitrile and benzonitrile. At 750°–800° C. the conversion of acetophenone is higher. At this temperature there are produced higher yields of acetonitrile and benzonitrile together with other nitriles, including acrylonitrile and tolylnitrile.

From our experiments we have found that nitriles are formed when ketones, either symmetrical or unsymmetrical, aliphatic, aromatic, or mixed, are heated to a temperature above their decomposition point in the presence of cyanogen. The yield and character of the reaction products vary somewhat with the temperature of the reaction and may require some experimentation to determine the optimum conditions for producing a given product. Thus the optimum conditions for production of acetonitrile from acetone and cyanogen are somewhat different from the optimum conditions for production of acrylonitrile from diethyl ketone and cyanogen.

In general, the use of an excess of cyanogen produces nitriles formed from the alkyl or aryl radicals liberated upon decomposition of the ketone, as the major product. When an excess of the ketone is used, other nitriles are formed which result from the reaction of cyanogen with decomposition and polymerization products of the ketone. As was previously pointed out, this reaction proceeds with any of a variety of ketones, both symmetrical and unsymmetrical, although symmetrical ketones are preferred since product recovery is simpler.

While this process has been described with considerable emphasis upon reactions of cyanogen with lower alkyl and aryl ketones, the process is operative with long-chain and branched-chain aliphatic ketones and substituted aryl ketones. The use of long-chain and branched-chain ketones, and substituted aryl ketones, in this process utilizes the same techniques as when the lower ketones are used except that the ketones are fed as liquids to the reactor, and a closer control of temperature is required to prevent the formation of an exceptionally large amount of undesirable by-products. Long-chain and branched-chain alkyl groups which are liberated in the decomposition of higher-molecular-weight ketones may decompose into a variety of hydrocarbon fragments which result in a variety of byproducts. However, the temperature at which the linkage between the alkyl groups and the carbonyl radical is broken is lower than the temperature at which the alkyl group is cracked, and so if the reaction is carried out in the temperature range just above the thermal decomposition point of the ketone, it is possible to produce higher alkyl nitriles without production of an excessive amount of by-products. With diaryl ketones, e. g., phenyl and naphthyl, there is less danger of decomposition of the free radicals due to the high stability of the aromatic nucleus.

Having thus described our invention as required by the patent statutes we wish to have it understood that within the scope of the appended claims this invention may be practiced otherwise than as specifically described.

What is claimed is:

1. A method of preparing organic nitriles of the formula RCN, where R is a hydrocarbon radical, which comprises reacting cyanogen and a ketone of the formula R'COR", where R' and R" are hydrocarbon radicals from which the nitrile is derived, at a temperature above the thermal decomposition point of the ketone in the range of 500°–1000° C.

2. A method according to claim 1 in which the ketone is a symmetrical ketone.

3. A method according to claim 1 in which the ketone is an unsymmetrical ketone.

4. A method according to claim 1 in which the ketone is an aliphatic ketone.

5. A method according to claim 1 in which the ketone is an aromatic ketone.

6. A method according to claim 1 in which the ketone is a mixed aromatic aliphatic ketone.

7. A method according to claim 1 in which the mol ratio of ketone to cyanogen is in the range from 1:20 to 20:1.

8. A method according to claim 7 in which the hourly space velocity of charge gases is from 50 to 2000.

9. A method of preparing lower aliphatic hydrocarbyl nitriles which comprises reacting cyanogen with acetone at a temperature above thermal decomposition point of the acetone in the range of 500°–1000° C.

10. A method according to claim 9 in which the reaction temperature is 550–750° C., the mol ratio of acetone to cyanogen is in the range of 1:6 to 6:1, the hourly space velocity of charge gases is 150 to 500, and the principal reaction product is acetonitrile.

11. A method of preparing lower aliphatic hydrocarbyl nitriles which comprises reacting cyanogen with diethyl ketone at a temperature above the thermal decomposition point of the ketone in the range of 500°–1000° C.

12. A method according to claim 11 in which the reaction temperature is 600°–750° C. and the principal reaction product is acrylonitrile.

13. A method according to claim 12 in which the mol ratio of diethyl ketone to cyanogen is from 1:6 to 6:1, and the hourly space velocity of charge gases is 150 to 500.

14. A method of preparing aliphatic and aromatic hydrocarbyl nitriles which comprises reacting cyanogen with acetophenone at a temperature above the thermal decomposition point of the ketone in the range of 500°–1000° C.

15. A method of preparing benzonitrile which comprises reacting cyanogen with benzophenone at a temperature above the thermal decomposition point of the ketone in the range of 500°–1000° C.

References Cited in the file of this patent

Migrdichian: "The Chem. of Organic Cyanogen Compounds," 1947, p. 287.

Steacie: "Atomic and Free Radical Reactions," 2nd ed., 1954, vol. I, p. 318.

Ibidem, vol. II, p. 636.